Dec. 12, 1933.  G. MEYER  1,939,128
PUMP VALVE
Filed March 25, 1929
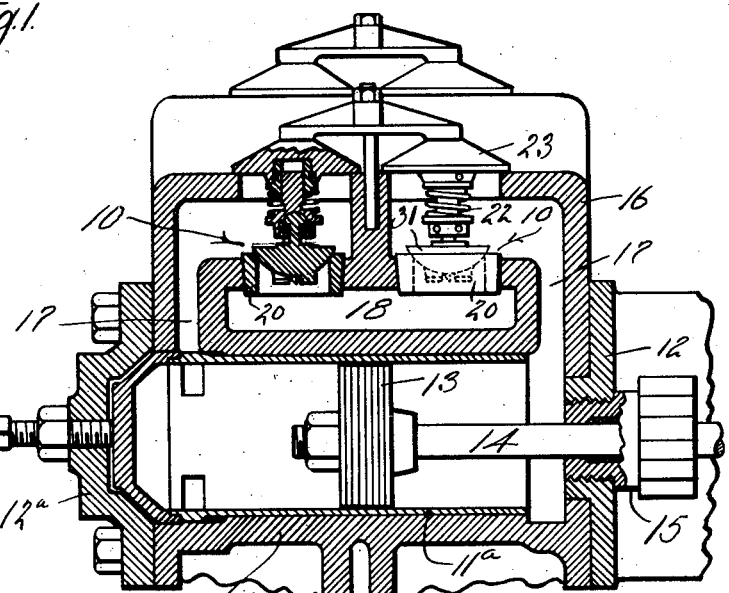
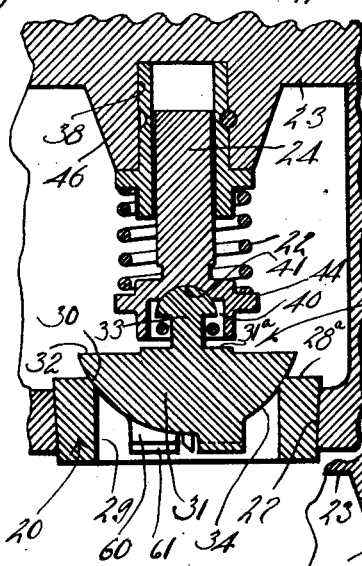
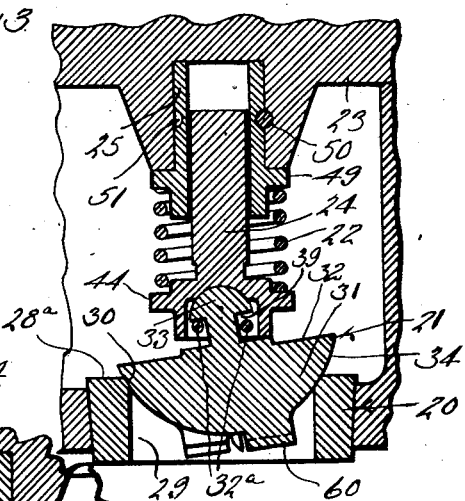
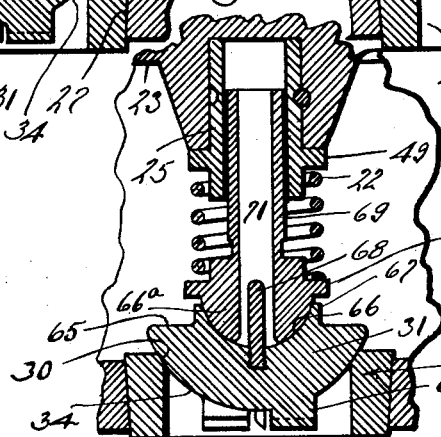
Inventor
Gerhard Meyer
by
His Attorney Patented Dec. 12, 1933

1,939,128

UNITED STATES PATENT OFFICE 1,939,128

PUMP VALVE

Gerhard Meyer, Los Angeles, Calif., assignor to F. C. Muren, Los Angeles, Calif.

Application March 25, 1929. Serial No. 349,765

8 Claims. (Cl. 251—144)

This invention relates to valves, and relates more particularly to pump valves, and it is a general object of the invention to provide an efficient, improved, and economical valve for use in slush pumps, or the like.

Valves used in pumps, and especially valves commonly used in pumps that handle fluid containing solid matter at high pressures, for example, slush pumps, wear rapidly and are usually more or less inefficient in operation. The usual ball valve has various recognized features of advantage for the class of use mentioned, however, this type of valve requires a ball of considerable size and its cost makes it commercially impractical.

It is a primary object of this invention to provide a pump valve that has the desirable characteristics of a ball valve but is less costly and is smaller than a ball valve.

It is another object of the invention to provide a valve that will wear evenly and maintain a perfect sealing fit with a seat during a long period of operation.

Another object of the invention is to provide a valve of the character mentioned that is of simple and inexpensive construction or formation.

It is a further object of the invention to provide a valve for a slush pump, or the like, that will operate dependably and without becoming mudded up.

A further object of the invention is to provide a valve of the character mentioned that occupies but little space in the valve chest of a pump and discharges the fluid into the valve chamber in a most desirable manner.

It is a further object of the invention to provide a valve of the character mentioned that has a fluid discharge opening that is unobstructed by guides, or other parts.

Another object of the invention is to provide a valve construction for a slush pump, or the like, whereby the head, or valve part proper, is free to center itself with reference to the seat.

A further object of the invention is to provide a valve of the character mentioned in which the head and stem are connected for relative movement.

It is a further object of the invention to provide a valve of the character mentioned in which the head and stem of the valve are swivelly connected.

The various objects and features of my invention will be best and more fully understood from the following detailed description of typical forms and embodiments of the invention, throughout which description reference is had to the accompanying drawing, in which:

Fig. 1 is a longitudinal sectional view of a common form of pump showing the intake valves of the pump embodying the invention and showing one of the valves in section. Fig. 2 is an enlarged detailed sectional view of one of the valves. Fig. 3 is a view similar to Fig. 2 showing the valve in a tilted position, and Fig. 4 is a detailed sectional view of another form of the invention.

The valve provided by this invention is applicable to various forms of machines and pumps. It is particularly adapted to pumps handling fluid at high pressure, and therefore in the following detailed description of typical forms of the invention I will describe the invention as embodied in the valves of a typical slush pump. It is to be understood, however, that the invention is not to be considered as limited to the specific application or forms herein described, but, on the other hand, is to be taken in its broader aspects as embodying variations or modifications that may fall within the scope of the claims.

The invention is illustrated as being embodied in the valves 10 of a common form of pump. The pump includes, generally, a cylinder 11, a liner 11ª in the cylinder, heads 12 and 12ª closing the ends of the cylinder, a piston 13 carried in the cylinder, a piston rod 14 connected to the piston and extending through a packing gland 15 in the head 12, a valve chest 16, suitable ports 17 between the ends of the cylinder 11 and the valve chest 16, a manifold 18, and various other parts common to pumps of this type. The valves 10 control flow of fluid between the manifold 18 and the ports 17. The valves illustrated in Fig. 1 are inlet valves.

Each of the valves 10 includes, generally, a seat ring 20 suitably mounted in the valve chest of the pump, and a movable part, or valve proper, 21. The valve 21 is normally held closed or in engagement with the seat by a spring 22 arranged between the valve and the removable cover plate 23 of the valve chest, the cover plate being adapted to close an opening in the valve chest which is in alignment with the valve seat.

The seat ring 20 is an annular member carried in an opening 27 in the valve chest of the pump. The exterior of the seat ring 20 is tapered inwardly and downwardly to firmly seat in the opening 27 which is tapered to receive it. The seat ring is provided with a central longitudinal opening 29, round in cross section, to pass fluid between the manifold 18 and a port 17 when the valve 21 is in the up or open position. The top 28ª of the seat ring may be flat as shown in the drawing. A face or seat 30 is provided at the upper inner part of the ring to cooperate with or receive the valve 21. The face 30 extends upwardly and outwardly and is spherically concave to receive the valve as hereinafter described.

The valve proper 21 includes a head 31 and a stem 24. The head 31 is in the form of a section or segment of a sphere and is proportioned and arranged to fit the face 30 of the seat ring 20. The head is arranged above the seat ring 20 and is arranged so that its spherical part or surface 34 faces downwardly to cooperate with the face 30 of the seat ring 20. The upper side or top 32 of the head may be flat as shown in the drawing. The face 34, which is spherically curved, is formed with the same radius as the face 30 of the seat ring 20 and is concentric with the face 30 when the valve is closed; and the face 34 is sufficiently large to extend a substantial distance above and beyond the face 30. This allows the head to properly fit or seat on the face 30 with the valve in various tilted positions as will be apparent from Fig. 3 of the drawing. The seating or sealing faces 30 and 34, being spherically formed and of the same radius, cooperate to effect a perfect sealing or closing of the valve.

The stem 24 is guided by the cover plate 23 and the head and stem are swivelly connected so that the head is free to tilt and rotate and thus center itself with relation to the seat ring 20. The axis or center of the swivel connection is coincident with the spherical surface 34 of the valve head.

In the form of the invention illustrated in Figs. 2 and 3 of the drawing, the stem 24 is connected to the top of the head by a ball and socket connection, there being a projection 33 centrally located on the top 32 of the head and a socket 40 in the lower end of the stem 24 carrying the projection. The top or outer end of the projection 33 is rounded or spherically curved. The socket has a spherically curved concave seat 41 which receives the outer end of the projection. The socket 40 is shaped and proportioned to hold the projection 33 so that the head 31 is free to rotate and have a limited tilting movement with relation to the stem 24.

The head 31 and the stem 24 may be secured together by locking pins 32ª carried by the stem and extending transversely through the socket 40. An annular groove 39 is provided in the projection 33 below its rounded end to pass the pins 32ª. The pins extend through the socket 38 at diametrically opposite sides of the projection 33 as shown in Figs. 2 and 3. The tilting movement of the head 31 is limited by the lower end of the stem 24 which engages a shoulder 31ª on the top of the head when the head moves to an extreme tilted position such as is shown in Fig. 3 of the drawing. The lower end of the stem 24 and the shoulder 31ª are related so that the head 31 cannot move to a position where it will not properly engage the seat ring 20.

The stem 24 is preferably an elongate member round in cross section and extends upwardly into a vertically disposed socket 38 in the removable cover plate 23. In the drawing I have illustrated a boss 46 extending downwardly from the lower side of the cover plate 23, and have shown the socket 38 formed centrally in the boss. In the form of the invention shown, a bushing 25 is provided in the socket 38 to slidably and rotatably carry the stem 24. The bushing 25 is provided with a central longitudinal opening which receives the stem 24. The bushing 25 is sufficiently long to carry a substantial portion of the stem 24, and to allow the stem to slide a substantial distance in the opening in the bushing. The bushing 25 may be retained in the socket by a pin 50 carried by the cover plate 23 extending through the wall portion of the socket 38. An annular groove 51 is provided on the exterior of the bushing to register with the pin 50.

The spring 22, which normally urges the valve 21 against the seat 20, is a helical spring and is arranged between a flange 44 on the lower end portion of the stem 24 and a flange 49 on the bushing 25. The flange 49 may seat upwardly against the lower end of the boss 46 as shown in the drawing. The spring, acting against the head 31 through the stem 24 and the swivel connection, between the stem and the head, does not materially interfere with the free movement of the head.

Means may be provided whereby the movement of the fluid passing through the opening 29 in the seat ring, when the valve is open, causes rotation of the head 31. This means may include blades or vanes 60 projecting downwardly from the central portion of the spherical surface 34 of the head. In the drawing I have shown four blades extending radially outward from a central point on the surface 34. The vanes 60 are arranged and formed so that they do not engage the wall of the opening 29 when the head is in a tilted position. The blades have beveled or pitched faces 61 which are engaged by the fluid passing through the valve. The fluid engaging the faces 61 causes the head to rotate.

In the form of the invention illustrated in Fig. 4 of the drawing, the parts are of the same general formation and arrangement as I have above described. In this form of the invention the swivel connection between the head and stem of the valve differs somewhat from the swivel connection above described. The top, or upper side of the head, is provided with a spherically curved socket 66 which receives a spherically curved enlarged part 66ª on the lower end of the stem. The socket 66 is spherically concave, is centrally located in the top 65 of the head, and its axis or center is coincident with that of the surface 34. The socket is surrounded at its edge with a rim 67 which projects from the top 65.

The enlarged part at the lower end of the stem 69 is spherically curved or rounded to seat in the socket 66 of the head. The stem fits the socket 66 so that the head is free to tilt to various positions and to rotate. The head may be prevented from becoming displaced from the stem 69 by a central pin 68 projecting upwardly from the bottom of the socket 66 into a central longitudinal opening 71 in the stem 69. The opening 71 freely passes the pin 68 so that the head is permitted to tilt the desired amount. The tilting movement of the head 31 is limited by the lower side of the flange 44ª which engages the top of the rim 67 when the head is in an extreme tilted position.

The other parts of this form of the invention are substantially the same as those of the form of the invention shown in Figs. 2 and 3, that is, the stem 69 is slidably carried in a bushing 25 mounted in the removable cover plate 23 and the spring 22, which urges the head 31 against the seat ring 20, is carried between a flange 44ª on the stem and a flange 49 on the bushing. Vanes 60 may also be provided on the under side of the head to cause rotation of the head as described above.

In operation, when the valve proper 21 is in the open position, the flow of fluid through the opening 29 of the seat ring causes the valve head 31 to turn or rotate. The head is free to tilt to various positions in the course of operation, and the spring 22 and the flow of fluid through opening 29 exert counteractive pressure so as to maintain bearing engagement of the spherical projection 33 or 66ª against the corresponding seat 41 or 66, so that the spherical projection is limited to concentric revolution, thereby limiting the tilting of head 31 to movement concentric with its spherical surface 34, since the center of this spherical surface is coincident with the center of the swivel connection. These movements of the head 31 cause the head to seat in different positions on the face 30, that is, different portions of the face 34 may engage the face 30 each time the valve closes. As the face 34 is extremely large, it is obvious that the valve provided by this invention is very durable. From the foregoing description it will be clear that the head 31 is free to tilt and rotate relative to the stem 24, with said tilting limited to movement concentric with its surface 34, and that the action of the spring 22 between the head 31 and the stem 69 does not interfere with the free movement of the head. The head 31 being rotatable and tiltable, concentric with its surface 34, centers itself evenly on the seating face 30 which is concentric with face 34 when the valve is closed, with the faces 30 and 34 cooperating to form a perfect seal when the valve is closed.

Having described only typical forms and embodiments of the invention, I do not wish to limit myself to the specific details set forth, but wish to reserve to myself any changes or variations that may appear to those skilled in the art or fall within the scope of the following claims:

Having described my invention, I claim:

1. A valve of the character described including, a head, a stem, and a connection between the stem and the head whereby the head is free to tilt and rotate in relation to the stem, said connection including a spherically curved projection on the head swivelly carried in a spherically curved socket in the stem, and means holding the projection against longitudinal movement in the socket.

2. A valve of the character described including, a head having a spherically curved seating face, a stem, and a connection between the stem and the head whereby the head is free to tilt and rotate with relation to the stem, said connections including a projection on the head having a spherically curved upper face swivelly carried in a correspondingly shaped socket in the stem and having a flat lower face, and a pin extending transversely through the socket below said flat lower face holding the projection in the socket.

3. In combination, a valve chamber, a valve seat in an opening in the chamber and having a spherically concaved face, a bushing in a socket in the valve chamber, a valve stem slidably guided by the bushing, a valve head having a flat upper face within the chamber and a spherically curved lower face to co-operate with the said concaved face, a swivel connection between the head and stem whereby the head is free to rotate and to tilt a substantial extent relative to the stem, the connection including a projection on the upper face of the head having a spherical end to co-operate with a socket in the stem, and a spring arranged between the bushing and stem to yieldingly hold the head in co-operation with the seat.

4. In combination, a valve chamber, a valve seat in an opening in the chamber and having a spherically concaved face, a bushing in a socket in the valve chamber, a valve stem slidably guided by the bushing, a valve head having a flat upper face within the chamber and a spherically curved lower face to co-operate with the said concaved face, a swivel connection between the head and stem whereby the head is free to rotate and to tilt a substantial extent relative to the stem, the connection including a projection on the upper face of the head having a spherical end to co-operate with a socket in the stem, the center of said connection being coincident with the center of curvature of the spherical lower face of the head, and a spring arranged between the bushing and stem to yieldingly hold the head in co-operation with the seat.

5. In combination, a valve having an arcuate contacting surface, guide means for the valve, and an arcuate bearing fixed relative to the valve and mounted in the guide means, said bearing adapting the valve for shifting circumferentially of its arcuate contacting surface and having means for maintaining said shifting of the valve concentric with said arcuate contacting surface, the arcuate bearing being of appreciably shorter radius than that of the arcuate contacting surface of the valve.

6. In combination, a valve having a contacting surface comprising a segment of a sphere, guide means for the valve, an arcuate bearing fixed relative to the valve and mounted in the guide means, said bearing adapting the valve for universal revolution and having means for maintaining said revolution of the valve concentric with the contacting surface of the valve, the arcuate bearing being of appreciably shorter radius than that of the contacting surface of the valve.

7. In combination, a valve having an arcuate contacting surface, guide means for the valve, an arcuate bearing fixed relative to the valve and mounted in the guide means, said bearing adapting the valve for shifting circumferentially of its arcuate contacting surface and having means for maintaining said shifting of the valve concentric with said arcuate contacting surface, the arcuate bearing being of appreciably shorter radius than that of the arcuate contacting surface of the valve, and means for limiting circumferential shifting of the valve in planes extending in the direction of opening and closing movement of the valve.

8. In combination, a valve chamber, a valve seat in an opening in the wall of the chamber and having a spherically curved concaved face, a stem, a head having a flat upper face in the chamber and a spherically curved lower face to cooperate with the face of the seat, and a swivel connection between the head and stem above said flat face, the center of the connection being coincident with that of the curvature of the lower face of the head, the connection including a spherically curved projection on the upper face of the head cooperating with a correspondingly shaped socket in the stem, the radii of curvature of the projection and socket being appreciably shorter than the radii of said curved faces.

GERHARD MEYER.